United States Patent
Mouleeswaran et al.

(10) Patent No.: US 12,229,128 B2
(45) Date of Patent: Feb. 18, 2025

(54) JOINING JAVASCRIPT OBJECT NOTATION (JSON) QUERIES ACROSS CLOUD RESOURCES

(71) Applicant: Palo Alto Networks, Inc., Santa Clara, CA (US)

(72) Inventors: Chandra Biksheswaran Mouleeswaran, Cupertino, CA (US); Rama Teja Repaka, Sunnyvale, CA (US); Xiaoyan Wang, Pleasanton, CA (US); Parul Shukla, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/397,002

(22) Filed: Dec. 27, 2023

(65) Prior Publication Data

US 2024/0126752 A1    Apr. 18, 2024

Related U.S. Application Data

(63) Continuation of application No. 17/153,724, filed on Jan. 20, 2021, now Pat. No. 11,880,363.

(51) Int. Cl.
*G06F 16/245* (2019.01)
*G06F 16/2453* (2019.01)
*H04L 67/10* (2022.01)

(52) U.S. Cl.
CPC .. *G06F 16/24537* (2019.01); *G06F 16/24544* (2019.01); *H04L 67/10* (2013.01)

(58) Field of Classification Search
CPC ......... G06F 16/24537; G06F 16/24544; H04L 67/10
See application file for complete search history.

(56) References Cited

U.S. PATENT DOCUMENTS

| | | | |
|---|---|---|---|
| 6,687,687 B1 | 2/2004 | Smadja | |
| 9,141,667 B2 | 9/2015 | Barber et al. | |
| 10,248,694 B2* | 4/2019 | Bhide | G06F 16/9535 |
| 10,642,840 B1* | 5/2020 | Attaluri | G06F 16/335 |
| 10,831,789 B2* | 11/2020 | Srinivasan | H04L 63/0815 |
| 11,785,104 B2* | 10/2023 | Erlingsson | G06F 16/906 |
| | | | 709/224 |
| 2003/0065648 A1* | 4/2003 | Driesch, Jr. | G06F 16/24545 |

(Continued)

OTHER PUBLICATIONS

PCT Application No. PCT/US2022/070273, International Search Report, mailed May 4, 2022, 2 pages.

(Continued)

*Primary Examiner* — Hosain T Alam
*Assistant Examiner* — Robert F May
(74) *Attorney, Agent, or Firm* — Gilliam IP PLLC (57) ABSTRACT

A cloud resource join query for join operations across cloud resources is parsed to extract join rules and queries to each cloud resource in the cloud resource join query. Results from the individual cloud queries are dynamically indexed based on pairs of cloud resources indicated in the join rules. A search engine applies first order predicates in the join rules using the dynamic indexes to generate pairwise join results corresponding to the query. A result for the cloud resource join query comprises the pairwise join results after merging.

20 Claims, 6 Drawing Sheets

(56) References Cited

U.S. PATENT DOCUMENTS

2019/0042649 A1* 2/2019 Meau .................. H04L 67/53
2021/0034598 A1* 2/2021 Arye .................. G06F 16/288

OTHER PUBLICATIONS

PCT Application No. PCT/US2022/070273, Written Opinion of the International Searching Authority, mailed May 4, 2022, 7 pages.
Kolev, et al., "Cloud MdsQL: querying heterogeneous cloud data stores with a common language", Distributed and Parallel Databases. 34. 10.1007/s10619-015-7185-y., Sep. 25, 2015, 41 pages.

* cited by examiner

JOINING JAVASCRIPT OBJECT NOTATION (JSON) QUERIES ACROSS CLOUD RESOURCES

BACKGROUND

This disclosure generally relates to data processing and to database and file access.

Inner joins (hereinafter "joins") are operations in relation algebra used to merge results across indexes in relational databases based on common values for a particular column or object. Results are joined based on having identical values for specific entries of each column value or object in the relational database as specified by a join query to the database. Joins can be combined across more than two indexes using an "and" logical operator by merging join results from each of the pairwise join operations.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to joining results of JavaScript Object Notation (JSON) queries across cloud resources in illustrative examples. Aspects of this disclosure can be instead applied to joining results of queries for other file formats across cloud resources. In other instances, well-known instruction instances, protocols, structures and techniques have not been shown in detail in order not to obfuscate the description.

Overview

An optimized join for cloud resources disclosed herein evaluates cloud resource join queries by dynamic indexing of query results from each cloud resource and evaluating and merging pairwise joins on the dynamic indexes for the query results. A join query parser parses a cloud resource join query to isolate join rules corresponding to first order predicates on pairs of cloud resources from JavaScript Object Notation ("JSON") rules to JSON files on individual cloud resources. An information retrieval system parses the JSON rules to generate queries to a database of fingerprints corresponding to the cloud resources and retrieves corresponding cloud resource fingerprint results. An optimized join filter comprises a dynamic indexer that generates an index corresponding to each first order predicate for each pair of cloud resources, and a search engine uses the indexes to find pairwise cloud resource join results for each first order predicate. The optimized join filter merges the pairwise cloud resource join results by identifying results comprising fingerprints from each cloud resource that simultaneously satisfy each first order predicate to generate a cloud resource join query result.

Example Illustrations

Figure 1:
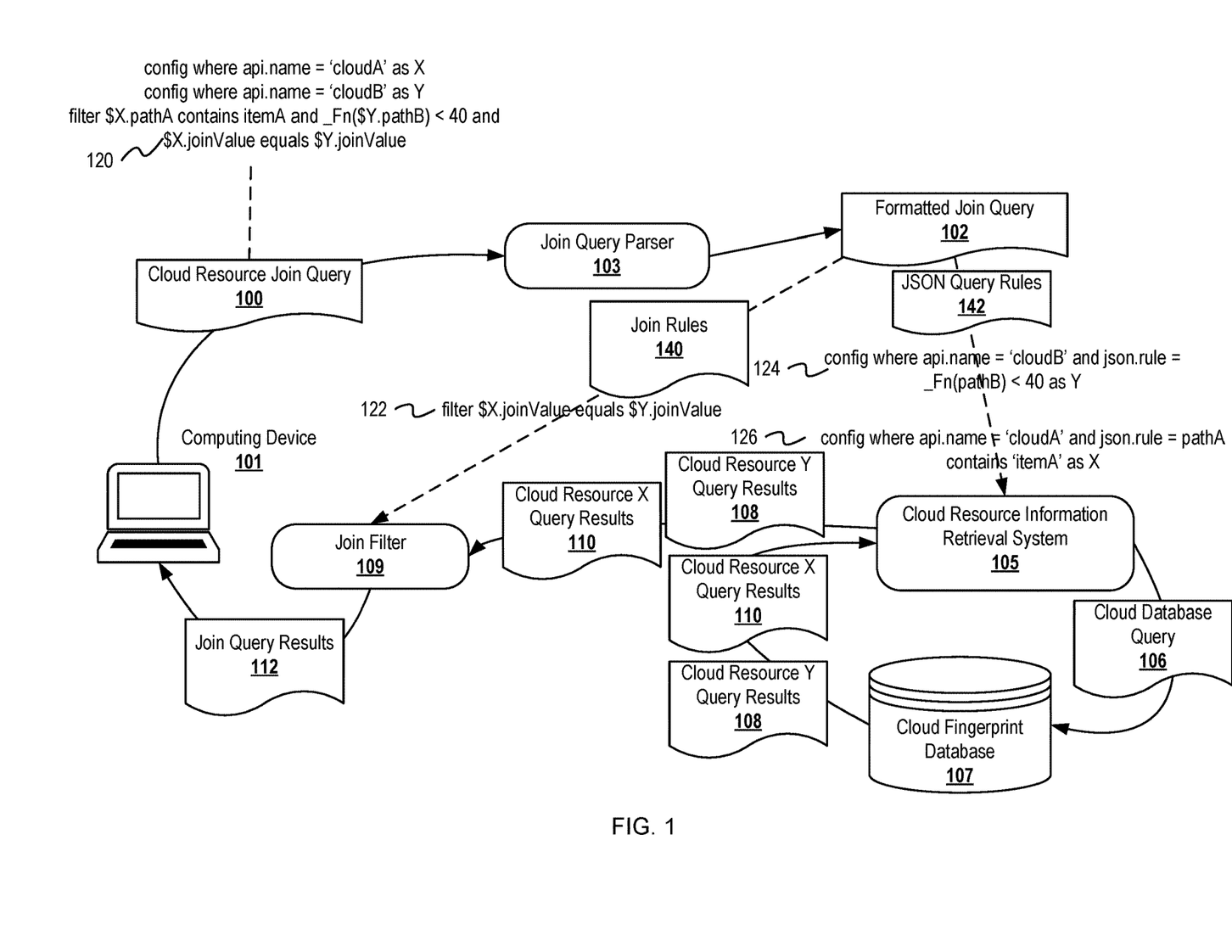
FIG. 1 is a schematic diagram of an example system for joining JSON query rules across cloud resources.

FIG. 1 is a schematic diagram of an example system for joining JSON query rules across cloud resources. A computing device 101 communicates a cloud resource join query 100 to a join query parser 103. The join query parser 103 parses the cloud resource join query 100 and splits it into join rules 140 and JSON query rules 142 which query individual cloud resources. A cloud resource information retrieval system 105 receives the JSON query rules 142 and generates a cloud database query 106 to one or more cloud resources which the cloud resource information retrieval system 105 communicates to a cloud fingerprint database 107. The cloud fingerprint database 107 returns cloud resource query results including cloud resource X query results 110 and cloud resource Y query results 108. The cloud resource information retrieval system 105 communicates the cloud resource X query results 110 and the cloud resource Y query results 108 to a join filter 109. The join filter 109 additionally receives the join rules 140 and applies the join rules 140 to the cloud resource X query results 110 and the cloud resource Y query results 108 to generate join query results 112 which the join filter 109 communicates to the computing device 101.

An example cloud resource join query 120 comprises the following syntax:

config where api.name='cloudA' as X
config where api.name='cloudB' as Y
filter $X.pathA contains itemA and _Fn($Y.pathB)<40 and $X.joinValue equals $Y.joinValue.

The example cloud resource join query 120 is a combination of JSON rules defined on objects in JSON files on cloud resources and a join on filtered cloud resources after the JSON rules are applied. The first line defines a variable X as the cloud resource with api.name 'CloudA' and the second line defines a variable Y as the cloud resource with api.name 'CloudB'. The third line specifies a join rule (using the 'filter . . . ' syntax) of all JSON object pairs in cloud resources CloudA and CloudB filtered according to the first two lines, joined such that the path in X contains item A, a custom function _Fn(x) applied to x=the path in Y is less than 40, and the value of X.joinValue equals Y.joinValue. Although depicted for two cloud resources, the example cloud resource join query 120 can include a filter (i.e., a join rule) across an arbitrary number of cloud resources. Results from JSON rules for each cloud resource can be combined according to the join rules using a combination of joins and merging the resulting join sets, as described variously below.

The join query parser 103 parses the cloud resource join query 100 into a formatted join query 102 comprising join rules 140 and JSON query rules 142. The join query parser 103 can extract JSON rules in the 'filter . . . ' segment of the cloud resource join query 100 and can insert them into the respective JSON rule segments of the cloud resource join query 100. For instance, an example join rule 122 after extraction of the JSON rules comprises the following:

filter $X.joinValue equals $Y.joinValue

Example JSON query rules 124 and 126 comprise the following:

config where api.name='cloudB' and json.rule=_Fn (pathB)<40 as Y     config where api.name='cloudA' and json.rule=pathA contains 'itemA' as X In this instance, the join query parser 103 generates the example JSON query rules 124 and 126 by detecting the "$ . . . " syntax in the filter segment of the example cloud resource join query 120. Subsequently, the join query parser 103 identifies the segments corresponding to the X cloud resource and to the Y cloud resource in the corresponding JSON rules in the example cloud resource join query 120, adds the respective cloud resource segments to the "config . . . " segments, and translates the syntax using predefined syntactical rules that can depend on the implemented query format. The JSON rule segments in the "filter . . . " segment of the example cloud resource join query 120 are replaced by the respective cloud resource identifiers (X and Y) in the resulting example join rules 140.

A cloud resource information retrieval system 105 receives the JSON query rules 142 and uses them to generate a cloud database query 106. The cloud resource information retrieval system 105 can comprise a JSON query parser that generates a query for cloud resources based on logical rules in the JSON query rules 142. The JSON query parser 103 can be a parser generated by a compiler-compiler that can handle first-order logical rules defined by a context-free grammar. The cloud resource information retrieval system 105 can use the generated logical rules to identify a set of one or more cloud resources related to the logical rules. For instance, the cloud resource information retrieval system 105 can use profiles and/or fingerprints maintained for each cloud resource to detect key/value pairs, fingerprints, and/or other metadata present in the logical rules that identifies a cloud resource. In the given examples, the cloud resource information retrieval system 105 can identify cloud resources 'cloudA' and 'cloudB' based on API names indicated in the example JSON query rules 142. Subsequently, the cloud resource information retrieval system 105 uses the generated logical rules to generate queries to the identified cloud resources using a query format for the identified cloud resources in the cloud fingerprint database 107. The cloud resource information retrieval system 105 subsequently communicates the cloud database query 106 comprising the generated queries to the cloud fingerprint database 107 which returns cloud resource X query results 110 and cloud resource Y query results 108 to the cloud resource information retrieval system 105.

The cloud fingerprint database 107 can comprise fingerprints for objects in JSON files stored on known cloud resources. The fingerprints can comprise identifiers for objects that are frequently queried for each respective cloud resource. The cloud fingerprint database 107 can maintain a profile for each cloud resource as it receives queries. A profile can indicate frequency of queried objects and/or other characteristics, statistics, identifiers, etc. for each object. JSON objects with low query frequency over periods of times (e.g., after being checked based on a schedule) can be removed from the cloud fingerprint database 107. In some embodiments, when the cloud fingerprint database 107 receives the cloud database query 106, some of the query results can return null values. However, the cloud resource query results 108 and 110 can comprise objects including key/value pairs in queries that returned null values. Storing cloud resources as fingerprints reduces storage costs while maintaining a join functionality for cloud queries.

The join filter 109 receives the join rules 140, the cloud resource X query results 110, and the cloud resource Y query results 108. The join filter 109 uses a dynamic indexer, a search engine, and a join results merger to generate the join query results 112 which it communicates to the computing device 101. The operations for joining cloud resource query results using join rules are described with greater detail in FIG. 2. The computing device 101 can comprise a user interface that allows a user to generate cloud resource join queries and tune parameters of the algorithm for joining cloud resource queries.

Figure 2:
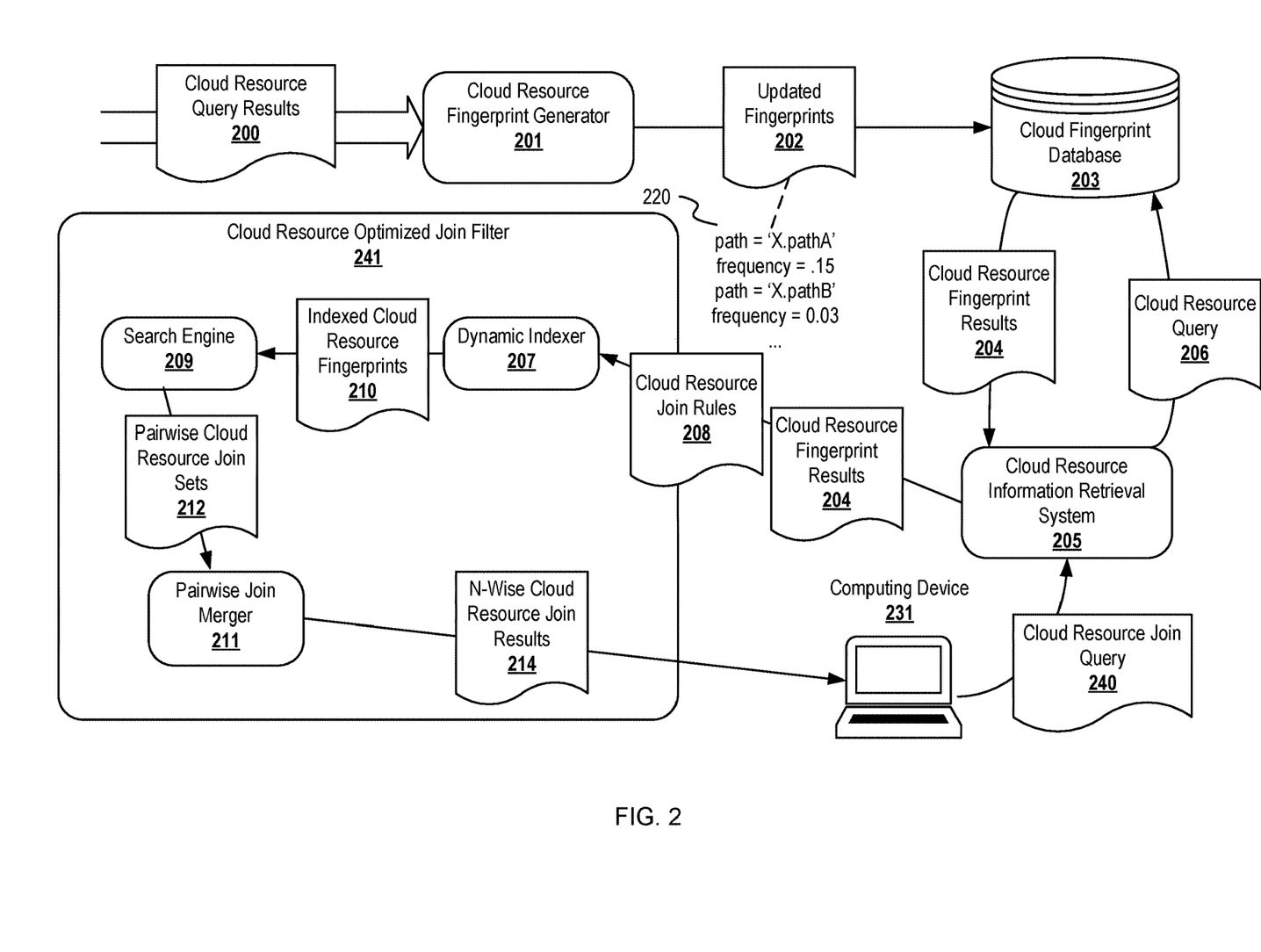
FIG. 2 is a schematic diagram of an example system for parsing a cloud resource query with a cloud resource optimized join filter.

FIG. 2 is a schematic diagram of an example system for parsing a cloud resource query with a cloud resource optimized join filter. A cloud resource fingerprint generator 201 receives cloud resource query results 200 which it uses to generate updated fingerprints 202. The cloud resource fingerprint generator 201 communicates the generated fingerprints 202 to a cloud fingerprint database 203 for subsequent storage. In a separate but parallel pipeline, a computing device 231 communicates a cloud resource join query 240 to a cloud resource information retrieval system 205. The cloud resource information retrieval system 205 extracts a cloud resource query 206 from the cloud resource join query 240, and the cloud fingerprint database 203 receives the cloud resource query 206. The cloud fingerprint database 203 returns cloud resource fingerprint results 204. The cloud resource information retrieval system 205 communicates the cloud resource fingerprint results 204 and cloud resource join rules 208 extracted from the cloud resource join query 240 to a cloud resource optimized join filter 241 comprising a dynamic indexer 207. The dynamic indexer 207 generates indexed cloud resource fingerprints 210 which are received by a search engine 209. The search engine 209 generates pairwise cloud resource join sets 212 from the indexed cloud resource fingerprints 210. A pairwise join merger 211 receives the pairwise cloud resource join sets 212 and generates N-wise cloud resource join results 214 which are received by the computing device 231.

The cloud resource fingerprint generator 201 can parse the cloud resource query results 200 to identify cloud resources and JSON objects corresponding to the cloud resource query results 200. The cloud resource fingerprint generator 201 can query the cloud fingerprint database 203 for existing fingerprints corresponding to the cloud resource query results 200 and can update these fingerprints accordingly. For instance, example updated fingerprints 220 comprise the following fields:

path='X.pathA' frequency=0.15 path='X.pathB' frequency=0.03

The cloud resource fingerprint generator 201 can receive previous frequency values for X.pathA and X.pathB in cloud resource queries and update them according to queries to X.pathA and X.pathB in the cloud resource query results 200. In some embodiments, the cloud fingerprints include other statistics and/or characteristics such as known importance for JSON objects in fingerprints, identifiers for fingerprints, etc. The cloud fingerprint database 203 can be indexed by path locations and cloud identifiers for JSON objects corresponding to stored fingerprints.

The cloud resource join query 240 comprises a combination of JSON rules and join rules, wherein the JSON rules comprise rules for querying JSON objects on cloud resources and the join rules comprise rules for combining JSON object results across cloud resources. The cloud resource information retrieval system 205 can comprise a cloud resource join query parser that can extract the JSON rules and join rules from the cloud resource join query 240 and can further extract the cloud resource query 206 using the JSON rules and a JSON query parser generated by a compiler-compiler using a context-free grammar. The cloud resource query 206 can comprise a list of cloud resources and corresponding paths in each cloud resource for which to retrieve a fingerprint. The cloud resource information retrieval system 205 communicates the cloud resource fingerprint results 204 returned by the cloud fingerprint database 203 and cloud resource join rules 208 generated from the cloud resource join query 240 to the dynamic indexer 207.

The cloud resource join rules 208 comprise first order predicates that define join rules between fingerprints retrieved for pairs of cloud resources. The full join rule expressed by the cloud resource join rules 208 comprises an intersection of each of the pairwise join rules expressed by first order predicates. The dynamic indexer 207 generates indexes for each first order predicate, the search engine 209 evaluates each of the first order predicates for corresponding fingerprints in the cloud resource fingerprint results 204, and the pairwise join merger 211 performs an intersection and de-duplication in the pairwise cloud resource join sets 212. Example first order predicates in the cloud resource join rules 208 include the following:

FOPCContains($.X.path1, $.Y.path2) and FOPCNotEquals($.Y.path1, $.Z.path2)

The first order predicate specifies a join rule between cloud resource X and cloud resource Y that the JSON object at X.path1 contains the JSON object at Y.path2. The second first order predicate specifies a join rule between cloud resource Y and cloud resource Z that the JSON object at Y.path1 does not equal the JSON object at Z.path2, and the comprehensive join rule specifies triplets of JSON objects across cloud resources X, Y, and Z satisfying both of the first order predicates.

The dynamic indexer 207 generates indexes for each of the first order predicates between pairs of the cloud resources in the cloud resource fingerprint results 204. The dynamic indexer 207 can use any indexing schema that is conducive to efficient lookup for file formats. For instance, the dynamic indexer 207 can represent an inverted index or use B+ trees to generate each index. The type of index can depend on statistics of the cloud resource fingerprint results 204, for instance, number of distinct fingerprints for each cloud resource, similarity of frequencies or other statistics for JSON object queries corresponding to fingerprints, etc. B+ trees can be implemented for cloud resources having more distinct fingerprints in the cloud resource fingerprint results 204 whereas balanced trees can be used for cloud resources having less distinct fingerprints. Indexes can be generated based on the first order predicates for the corresponding cloud resources. For instance, if a first order predicate specifies equality between X.path1 and Y.path2 for cloud resources X and Y, respectively, then the index can be generated based on object paths X.path1 and Y.path2. Indexes can be updated and maintained dynamically as queries in the cloud resource query 206 are processed by the cloud fingerprint database 203 and indexes can be maintained in parallel with other operations depicted in FIG. 2.

The search engine 209 receives the indexed cloud resource fingerprints 210 generated by the dynamic indexer 207 and uses the generated indexes to apply pairwise join rules corresponding to first order predicates in the cloud resource join rules 208. For instance, if the first order predicate specifies that X.path1 in cloud resource X equals Y.path2 in cloud resource Y, then the search engine 209 can search fingerprints in the indexed cloud resource fingerprints 210 wherein the fingerprint along X.path1 in cloud resource X matches the fingerprint along Y.path2 in cloud resource Y (the index can be constructed for exactly such a lookup operation). The search engine 209 communicates the pairwise cloud resource join sets 212 comprising pairs of JSON objects that satisfy pairwise join rules expressed as first order predicates to the pairwise join merger 211.

The pairwise join merger 211 merges the pairwise cloud resource join sets 212 to generate the N-wise cloud resource join results 214. The pairwise join merger 211 searches for tuples of fingerprints in each database represented in the cloud resource join rules 208 such that a pair of fingerprints in the tuple satisfies each of the corresponding first order predicates (i.e., that the pair of fingerprints is present in the tuple for each of the pairwise cloud resource join sets 212). The pairwise join merger 211 can fix a pair of fingerprints in one of the pairwise cloud resource join sets 212, can scan a second resource join set in the pairwise cloud resource join sets 212 for another pair of fingerprints such that the three resulting fingerprints simultaneously satisfy all join rules for the respective cloud resources, etc. This operation can be optimized using standard libraries/algorithms for multiple join sets. After merging, the cloud resource optimized join filter 241 can query cloud resources for objects stored on the cloud resources corresponding to fingerprints in the N-wise cloud resource join result 214. The pairwise join merger 211 communicates the resulting N-wise cloud resource join results 214 (where N is the number of cloud resources present in the resulting join sets) to the computing device 213 as a return for the cloud resource join query 240. The pairwise join merger 211 can additionally or alternatively communicate query results corresponding to queries to cloud resources for objects indicated in the N-wise cloud resource join result 214 to the computing device 213.

Figure 3:
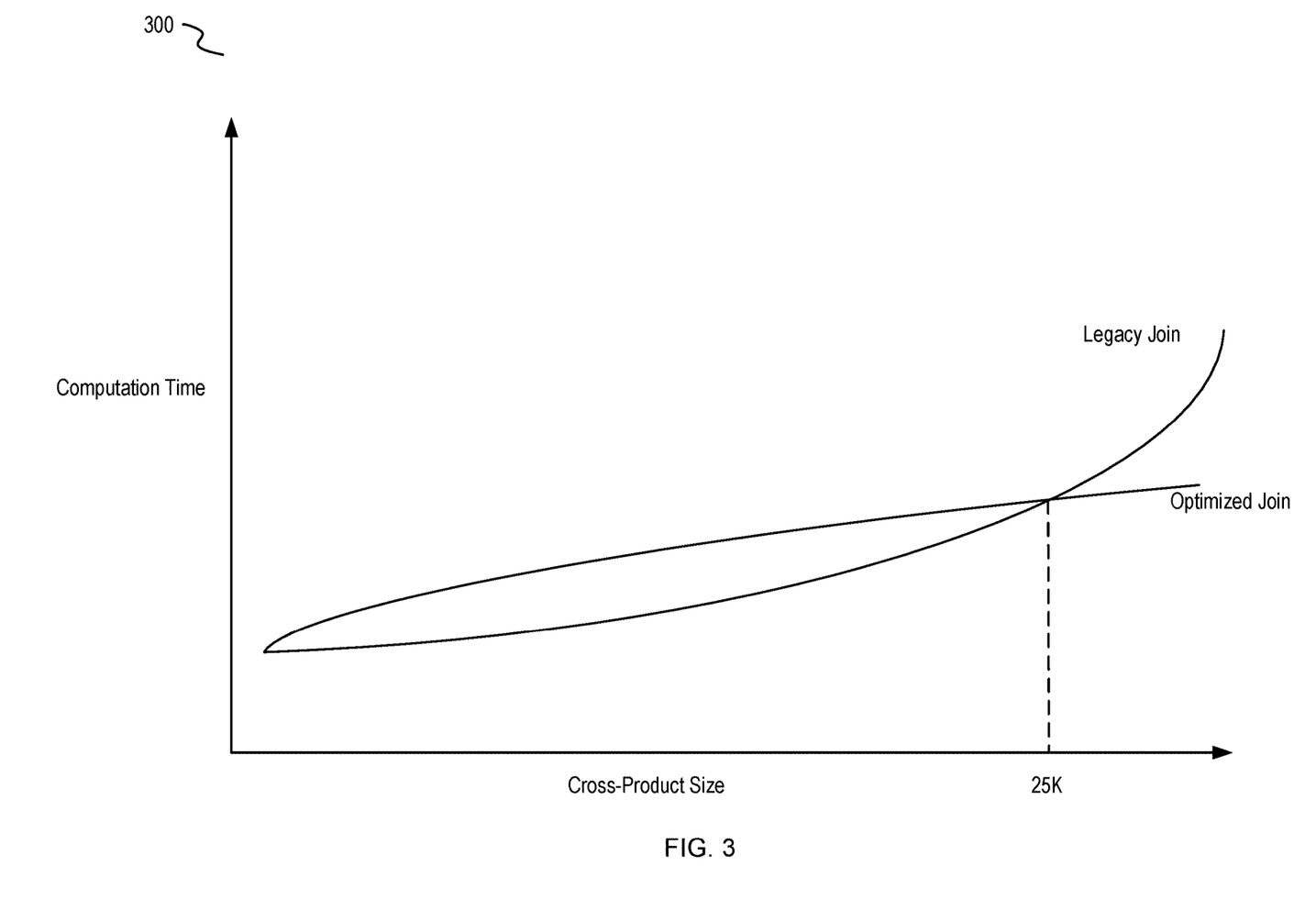
FIG. 3 is a graph of computation time versus cross product size for a legacy join and an optimized join for cloud resource join queries.

FIG. 3 is a graph of computation time versus cross product size for a legacy join and an optimized join for cloud resource join queries. The cross-product size represents the product of the number of item/value pairs in JSON files across each cloud resource in a cloud resource join query. For instance, the cross product size of a cloud resource join query across cloud resources X, Y, and Z with respective sizes 20, 100, and 50 is 20×100×50=100000. The cross product represents the search space using a legacy join. As seen in a graph 300, the optimized join presented herein that uses dynamic indexing after first applying JSON rules to cloud resources outperforms legacy join after cross-a product size of 25000. Conversely, the legacy join that performs a brute force search over the entire cross-product space without first applying JSON rules has less overhead due to dynamic indexing and thus outperforms dynamic indexing-based join at lower cross-product size but suffers as the cross-product size increases. The threshold cross-product size 25000 is arbitrary and depends on implementations of the legacy join and optimized join, types of file formats in cloud resource join queries, etc. and should be determined based on empirical performance of each join.

The example operations are described with reference to a join query parser, an information retrieval system, and an optimized join filter for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
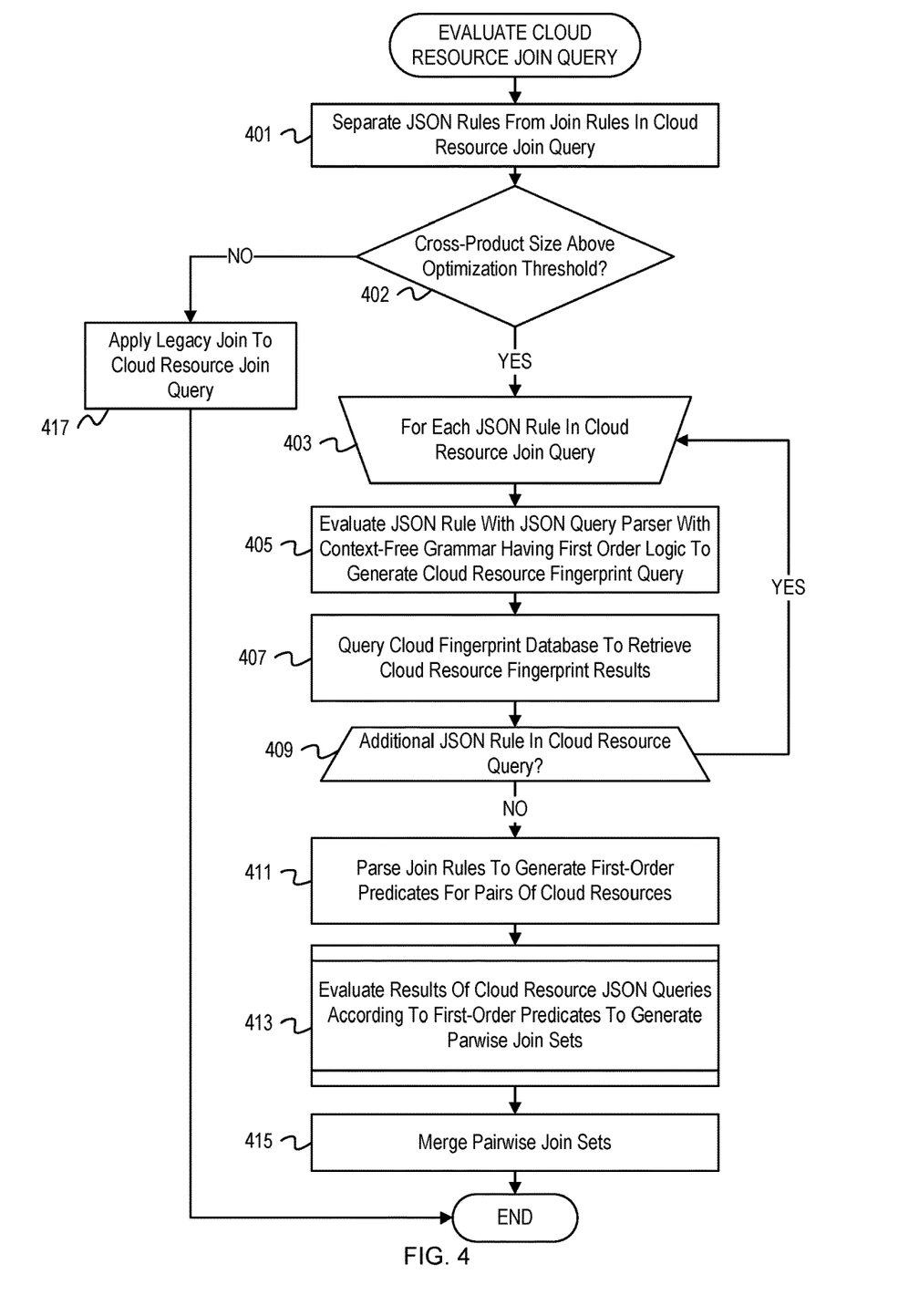
FIG. 4 is a flowchart of example operations for evaluating a cloud resource join query.

FIG. 4 is a flowchart of example operations for evaluating a cloud resource join query. At block 401, a join query parser separates JSON rules from join rules in a cloud resource join query. The join rules comprise first order predicates on objects in a pair of cloud resources. The JSON rules comprises rules for querying cloud resources comprising JSON files. Although described as JSON rules, these can be rules for any file format residing on cloud resources.

At block 402, an optimized join filter determines whether a cross-product size for the join rules is above an optimization threshold cross-product size. The cross-product size is a product of the number of item-value pairs in files on each cloud resource, multiplied across cloud resources. This corresponds to the order of magnitude of the search space of a brute-force join algorithm. The optimization threshold is chosen to be a cross-product size at which an optimized join filtering algorithm depicted at blocks 403, 405, 407, 409, 411, 413, and 415 outperforms a legacy (i.e., brute force) join filtering algorithm. This optimization threshold can be determined empirically and can depend on implementations of each algorithm and the cloud resources being queried. For instance, the optimization threshold can be determined by running the optimized join and legacy join to the same cloud resource join queries with varying cross product sizes and across varying cloud resources. The optimization threshold is therefore the cross product size at which the optimized join outperforms the legacy join in computation time on average across cloud resource join queries for that cross product size. If the cross-product size is above the optimization threshold, operations proceed to block 403. Otherwise, operations skip to block 417.

At block 403, an information retrieval system begins iterating through JSON rules separated in the cloud resource join query. The operations at each iteration are depicted at blocks 405 and 407.

At block 405, the information retrieval system evaluates the current JSON rules with a JSON query parser with a context-free first grammar with first-order logic to generate a cloud resource fingerprint query. The JSON query parser can be generated by a compiler-compiler using the context-free grammar as input. The information retrieval system can convert JSON queries resulting from the JSON query parser into a format specific to a cloud fingerprint database (e.g., based on an indexing schema of the cloud fingerprint database).

At block 407, the information retrieval system queries a cloud fingerprint database to retrieve cloud resource fingerprint results corresponding to the current JSON query. The query indicates characteristics of objects indicated in the JSON query such as paths corresponding to objects in the JSON query. The query can be formatted based on the type of indexing used in the cloud fingerprint database. The cloud fingerprint database can be indexed such that it can efficiently retrieve the cloud resource fingerprint results based on the queries (e.g., by using JSON file paths for cloud fingerprints).

At block 409, the information retrieval system determines whether there is an additional JSON rule in the cloud resource query. If an additional JSON rule is present, operations return to block 403. Otherwise, operations proceed to block 411.

At block 411, the optimized join filter parses join rules from the cloud resource join query to generate first order predicates for pairs of cloud resources. To exemplify, a join rule can be of the form filter X.path1 equal Y.path2 and the resulting first order predicate can be of the form

FOPCEquals(X.path1, Y.path2).

In both instances, the join operation corresponds to joining fingerprints that have equal path1 in cloud resource X and path2 in cloud resource Y (as indicated by the "FOPCEquals", i.e., first order predicate equals syntax).

At block 413, the optimized join filter evaluates results of the cloud resource JSON queries according to the first-order predicates to generate pairwise join sets. The operations at block 413 are described in greater detail in FIG. 5.

At block 415, the optimized join filter merges the pairwise join sets. The optimized join filter determines tuples of fingerprints in the cloud resource fingerprint results such that each pair of fingerprints in the tuple corresponding to a pair of cloud resources in the pairwise join sets is present in that pair set. Standard search techniques for merging join sets (e.g., merging Structure Language Query (SQL) inner join operations) can be implemented.

If it was determined that the cross-product size for the join rules is not above an optimization threshold cross-product size, then at block 417 the optimized join filter applies a legacy join to the cloud resource join query. The legacy join can be a brute force search of a cross-product of cloud resources present in the cloud resource join query against the join rules therein. Previous natively implemented join operations can also be used.

Figure 5:
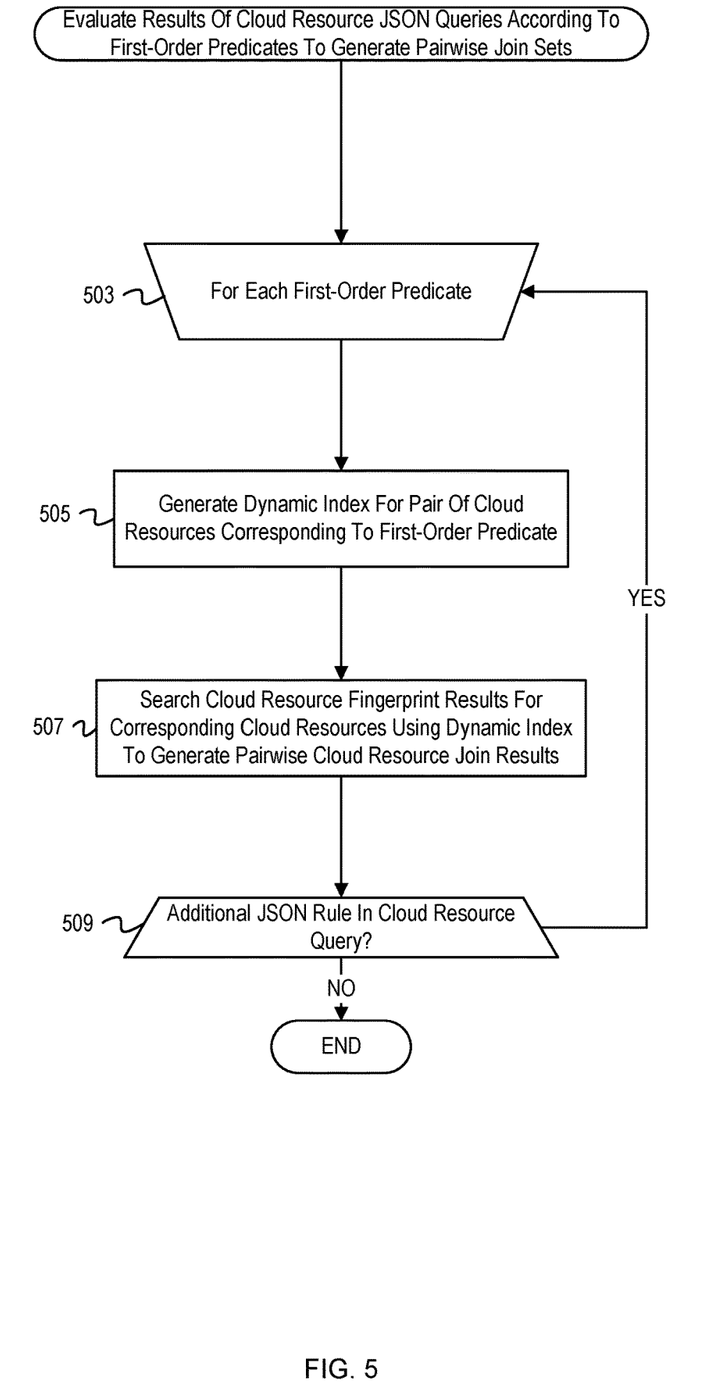
FIG. 5 is a flowchart of example operations for evaluating results of cloud resource JSON queries according to first-order predicates to generate pairwise join sets.

FIG. 5 is a flowchart of example operations for evaluating results of cloud resource JSON queries according to first-order predicates to generate pairwise join sets. At block 503, an optimized join filter begins iterating through first order predicates to be applied to cloud resources. The operations at each iteration occur at blocks 505 and 507.

At block 505, the optimized join filter generates a dynamic index for the pair of cloud resources corresponding to the current first-order predicate. The dynamic index can be generated based on the current first order predicate (e.g., by file paths indicated in the current first order predicate). To exemplify, the dynamic index can be an inverted index that comprises a mapping between key/value pairs and corresponding document identifiers in a cloud resource. For two cloud resources X and Y with paths X.vpcId and Y.resourceId respectively where X.vpcId takes values in the set {a, b}. The dynamic index for X can map a and b to sets of document identifiers as follows:

a→{1, 20, 111, . . . } b→{15, 18, 19}

Key/value pairs in Y are mapped in a similar way such that any key/value pair with value 'a' in Y will have a document identifier in the list {1, 20, 111, . . . } and any key/value pair with value 'b' in Y will have a document identifier in the list {15, 18, 19}. Dynamic indexes can be maintained and updated as join sets are computed and as fingerprints for cloud resources are updated.

At block 507, the optimized join filter searches cloud resource fingerprint results for corresponding cloud resources using the dynamic index to generate pairwise cloud resource join results. The optimized join filter can parse the current first order predicate to identify fingerprints in the respective results of JSON queries for the corresponding cloud resources to determine pairs of fingerprints satisfying the first order predicate to add to pairwise join results for the current first-order predicate. In the aforementioned example, computation of a join filter $X.vpcId equals $Y.resourceId comprises searching Y for document identifiers in the list {1, 20, 111, . . . } and determining whether the corresponding JSON file paths in Y are such that Y.resourceID='a'. Computing the join filter additionally comprises searching Y for document identifiers in the list {15, 18, 19} and determining whether the corresponding JSON file paths in Y are such that Y.resourceId='b'. The results from the join filter are the respective file paths in X and Y for JSON file paths with matching key/value pairs in the set {a,b}.

At block 509 the optimized join filter determines whether there is an additional JSON rule in the cloud resource query. If an additional JSON rule is present, operations return to block 503. Otherwise, the operations in FIG. 5 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 403, 405, 407, and 409 can be performed in parallel or concurrently. With respect to FIG. 4, instead applying a legacy join operation to the cloud resource join query is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
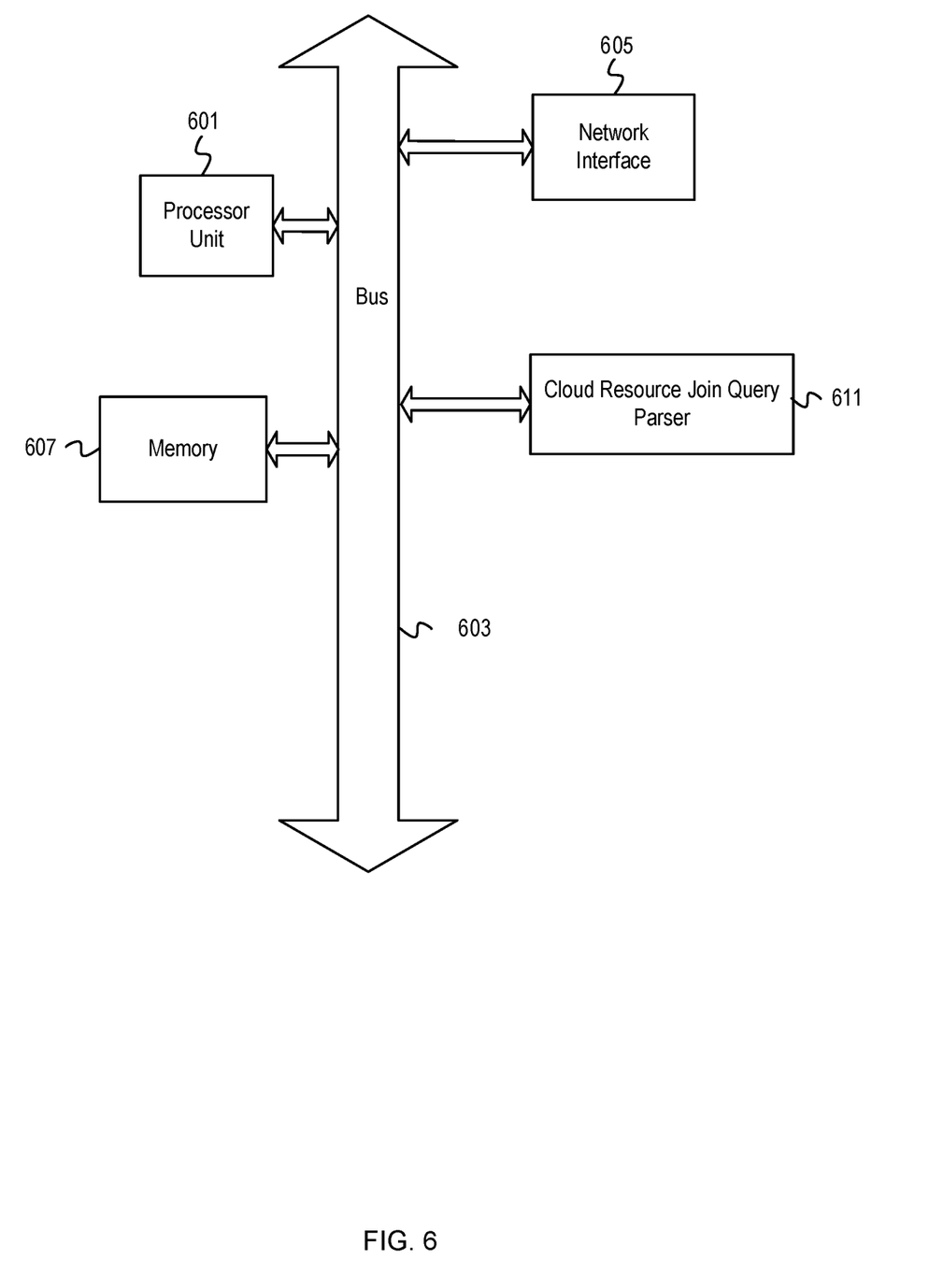
FIG. 6 depicts an example computer system with a cloud resource join query parser.

FIG. 6 depicts an example computer system with a cloud resource join query parser. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a cloud resource join query parser 611. The cloud resource join query parser 611 can parse a cloud resource join query to isolate join rules and JSON rules, parse the JSON rules to generate queries to a cloud fingerprint database, retrieve the corresponding query results from the cloud fingerprint database, and use dynamic indexing/search to join the query results from the cloud fingerprint database. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for parsing a cloud resource query to isolate join rules and JSON rules, then subsequently applying the JSON rules to cloud resources prior to the join rules to optimize the join operation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud resource," this description is referring to the resources of a cloud service provider. For instance, a cloud resource can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an application programming interface or software development kit provided by the cloud service provider.

A "fingerprint" used herein refers to a representation of one or more key/value pairs stored on a cloud resource. The fingerprint can be, for instance, an object in a JSON file stored on a cloud resource. The scope of fingerprints varies with respect to size/scope as well as choice of representation. Fingerprints are used as a proxy for more efficient storage than individual key/value pairs on the cloud resources and allow for more efficient join operations over smaller search space.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following.

Embodiment 1: A method comprising parsing a cloud resource join query to extract a first plurality of join rules and a first plurality of cloud resource queries, wherein the first plurality of join rules comprises a first plurality of first order predicates for pairs of cloud resources in a first plurality of cloud resources, querying a database of cloud fingerprints for a first plurality of fingerprints for the first plurality of cloud resources associated with the first plurality of cloud resource queries, joining fingerprints in the first plurality of fingerprints according to the first plurality of first order predicates in the first plurality of join rules to generate a first plurality of pairwise join results, and merging the first plurality of pairwise join results.

Embodiment 2: The method of Embodiment 1, wherein joining fingerprints in the first plurality of fingerprints according to the first order predicates comprises generating a first plurality of dynamic indexes for each pair of cloud resources corresponding to the first plurality of first order predicates, and searching each pair of cloud resources corresponding to the first plurality of first order predicates using the plurality of dynamic indexes for results satisfying at least one of the first plurality of first order predicates.

Embodiment 3: The method of Embodiment 1, wherein the first plurality of fingerprints comprises characteristics of queries to one or more objects stored on the first plurality of cloud resources.

Embodiment 4: The method of Embodiment 3, wherein the characteristics of queries to one or more objects stored on the first plurality of cloud resources comprise frequencies of querying the one or more objects.

Embodiment 5: The method of Embodiment 3, further comprising updating the first plurality of fingerprints based on recent queries to the first plurality of cloud resources.

Embodiment 6: The method of Embodiment 1, further comprising querying the first plurality of cloud resources for objects indicated in the merged first plurality of pairwise join results.

Embodiment 7: The method of Embodiment 6, further comprising communicating at least one of the merged first plurality of pairwise join results and results of querying the first plurality of cloud resources to a computing device communicatively coupled to a user interface.

Embodiment 8: The method of Embodiment 1, wherein parsing the cloud resource join query is based, at least in part, on a determination that a cross product size for the cloud resource join query is above a threshold cross product size.

Embodiment 9: One or more non-transitory machine-readable media comprising program code to parse a cloud resource join query to extract a first plurality of join rules and a first plurality of cloud resource queries, wherein the first plurality of join rules comprises a first plurality of first order predicates for pairs of cloud resources in a first plurality of cloud resources, query a database of cloud fingerprints for a first plurality of fingerprints for the first plurality of cloud resources associated with the first plurality of cloud resource queries, join fingerprints in the first plurality of fingerprints according to the first plurality of first order predicates in the first plurality of join rules to generate a first plurality of pairwise join results, and merge the first plurality of pairwise join results.

Embodiment 10: The non-transitory machine-readable media of Embodiment 9, wherein the program code to join fingerprints in the first plurality of fingerprints according to the first order predicates comprises program code to generate a first plurality of dynamic indexes for each pair of cloud resources corresponding to the first plurality of first order predicates, and search each pair of cloud resources corresponding to the first plurality of first order predicates using the plurality of dynamic indexes for results satisfying at least one of the first plurality of first order predicates.

Embodiment 11: The non-transitory machine-readable media of Embodiment 9, wherein the first plurality of fingerprints comprises characteristics of queries to one or more objects stored on the first plurality of cloud resources.

Embodiment 12: The non-transitory machine-readable media of Embodiment 11, wherein the characteristics of queries to one or more objects stored on the first plurality of cloud resources comprise frequencies of querying the one or more objects.

Embodiment 13: The non-transitory machine-readable media of Embodiment 11, further comprising program code to update the first plurality of fingerprints based on recent queries to the first plurality of cloud resources.

Embodiment 14: The non-transitory machine-readable media of Embodiment 9, further comprising program code to query the first plurality of cloud resources for objects indicated in the merged first plurality of pairwise join results.

Embodiment 15: The non-transitory machine-readable media of Embodiment 14, further comprising program code to communicate at least one of the merged first plurality of pairwise join results and results of querying the first plurality of cloud resources to a computing device communicatively coupled to a user interface.

Embodiment 16: The non-transitory machine-readable media of Embodiment 9, wherein the program code to parse the cloud resource join query is based, at least in part, on a determination that a cross product size for the cloud resource join query is above a threshold cross product size.

Embodiment 17: An apparatus comprising a processor, and a machine-readable medium having program code executable by the processor to cause the apparatus to parse a cloud resource join query to extract a first plurality of join rules and a first plurality of cloud resource queries, wherein the first plurality of join rules comprises a first plurality of first order predicates for pairs of cloud resources in a first plurality of cloud resources, query a database of cloud fingerprints for a first plurality of fingerprints for the first plurality of cloud resources associated with the first plurality of cloud resource queries, join fingerprints in the first plurality of fingerprints according to the first plurality of first order predicates in the first plurality of join rules to generate a first plurality of pairwise join results, and merge the first plurality of pairwise join results.

Embodiment 18: The apparatus of Embodiment 17, wherein the program code executable by the processor to cause the apparatus to join fingerprints in the first plurality of fingerprints according to the first order predicates comprises program code executable by the processor to cause the apparatus to generate a first plurality of dynamic indexes for each pair of cloud resources corresponding to the first plurality of first order predicates, and search each pair of cloud resources corresponding to the first plurality of first order predicates using the plurality of dynamic indexes for results satisfying at least one of the first plurality of first order predicates.

Embodiment 19: The apparatus of Embodiment 17, wherein the first plurality of fingerprints comprises characteristics of queries to one or more objects stored on the first plurality of cloud resources.

Embodiment 20: The apparatus of Embodiment 19, wherein the characteristics of queries to one or more objects stored on the first plurality of cloud resources comprise frequencies of querying the one or more objects.

The invention claimed is:

1. A method comprising:
generating a plurality of profiles for a plurality of cloud resources, wherein each profile of the plurality of profiles indicates at least one of statistics, characteristics, and identifiers for queried objects in a corresponding cloud resource in the plurality of cloud resources;
extracting a plurality of cloud resource queries and a plurality of join rules from a cloud resource join query, wherein the plurality of cloud resource queries comprises queries indicating one or more of the plurality of cloud resources;
identifying a subset of the plurality of cloud resources corresponding to the plurality of cloud resource queries based, at least in part, on matching indications of cloud resources in the plurality of cloud resource queries with the plurality of profiles; and
evaluating the plurality of join rules against profiles in the plurality of profiles corresponding to the subset of the plurality of cloud resources to generate a join result for the cloud resource join query.

2. The method of claim 1, wherein the plurality of join rules comprises a plurality of first order predicates for pairs of cloud resources in the plurality of cloud resources.

3. The method of claim 2, wherein evaluating the plurality of join rules against profiles in the plurality of profiles corresponding to the subset of the plurality of cloud resources comprises,
for each first order predicate in the plurality of first order predicates,
generating an index for pairs of cloud resources in the plurality of cloud resources corresponding to the first order predicate; and
searching profiles in the plurality of profiles corresponding to each of the pairs of cloud resources using the index for one or more join results satisfying at least one of the plurality of first order predicates; and
merging join results for the plurality of first order predicates to generate the join result for the cloud resource join query.

4. The method of claim 1, wherein the statistics of queried objects comprise frequencies of querying objects.

5. The method of claim 1, further comprising updating the plurality of profiles based on recent queries indicating the plurality of cloud resources.

6. The method of claim 1, further comprising querying the plurality of cloud resources for objects indicated in the join result.

7. The method of claim 1, wherein extracting the plurality of cloud resource queries and the plurality of join rules from the cloud resource join query is based, at least in part, on a determination that a cross product size for the cloud resource join query is above a threshold cross product size.

8. A non-transitory machine-readable medium comprising program code to:
generate a plurality of profiles for a plurality of cloud resources, wherein each profile of the plurality of profiles indicates at least one of statistics, characteristics, and identifiers for objects queried to a corresponding cloud resource of the plurality of cloud resources;
parse a cloud resource join query to extract a plurality of cloud resource queries and a plurality of join rules from a cloud resource join query, wherein the plurality of cloud resource queries comprises queries indicating one or more of the plurality of cloud resources;
identify a subset of the plurality of cloud resources corresponding to the plurality of cloud resource queries based, at least in part, on matching indications of cloud resources in the plurality of cloud resource queries with the plurality of profiles; and
evaluate the plurality of join rules against profiles in the plurality of profiles for the subset of the plurality of cloud resources to generate a join result corresponding to the cloud resource join query.

9. The non-transitory machine-readable medium of claim 8, wherein the plurality of join rules comprises a plurality of first order predicates for pairs of cloud resources in the plurality of cloud resources.

10. The non-transitory machine-readable medium of claim 9, wherein the program code to parse the cloud resource join query to extract the plurality of join rules against profiles in the plurality of profiles corresponding to the subset of the plurality of cloud resources comprises instructions to:
for each first order predicate in the plurality of first order predicates,
generate an index for pairs of cloud resources in the plurality of cloud resources corresponding to the first order predicate; and search profiles in the plurality of profiles corresponding to each of the pairs of cloud resources using the index for one or more join results satisfying at least one of the plurality of first order predicates; and merge join results for the plurality of first order predicates to generate the join result for the cloud resource join query.

11. The non-transitory machine-readable medium of claim 8, wherein the statistics of queried objects comprise frequencies of querying objects.

12. The non-transitory machine-readable medium of claim 8, wherein the program code further comprises instructions to update the plurality of profiles based on recent queries indicating the plurality of cloud resources.

13. The non-transitory machine-readable medium of claim 8, wherein the program code further comprises instructions to query the plurality of cloud resources for objects indicated in the join result.

14. The non-transitory machine-readable medium of claim 8, wherein the program code to extract the plurality of cloud resource queries and the plurality of join rules from the cloud resource join query is based, at least in part, on a determination that a cross product size for the cloud resource join query is above a threshold cross product size.

15. An apparatus comprising:
a processor; and
a machine-readable medium having instructions stored thereon that are executable by the processor to cause the apparatus to,
  maintain a plurality of profiles for a plurality of cloud resources, wherein each profile of the plurality of profiles indicates at least one of statistics, characteristics, and identifiers for objects queried to a corresponding cloud resource of the plurality of cloud resources; and
  based on receiving a cloud resource join query to at least a subset of the plurality of cloud resources,
    parse the cloud resource join query to extract a plurality of cloud resource queries and a plurality of join rules from a cloud resource join query, wherein the plurality of cloud resource queries comprises queries indicating one or more of the plurality of cloud resources;
    identify a subset of the plurality of cloud resources corresponding to the plurality of cloud resource queries based, at least in part, on matching indications of cloud resources in the plurality of cloud resource queries with the plurality of profiles; and
    evaluate the plurality of join rules against profiles in the plurality of profiles for the subset of the plurality of cloud resources to generate a join result corresponding to the cloud resource join query.

16. The apparatus of claim 15, wherein the plurality of join rules comprises a plurality of first order predicates for pairs of cloud resources in the plurality of cloud resources.

17. The apparatus of claim 16, wherein the instructions to parse the cloud resource join query to extract the plurality of join rules against profiles in the plurality of profiles corresponding to the subset of the plurality of cloud resources comprise instructions executable by the processor to cause the apparatus to:
for each first order predicate in the plurality of first order predicates,
  generate an index for pairs of cloud resources in the plurality of cloud resources corresponding to the first order predicate; and
  search profiles in the plurality of profiles corresponding to each of the pairs of cloud resources using the index for one or more join results satisfying at least one of the plurality of first order predicates; and
merge join results for the plurality of first order predicates to generate the join result for the cloud resource join query.

18. The apparatus of claim 15, wherein the statistics of queried objects comprise frequencies of querying objects.

19. The apparatus of claim 15, further comprising instructions executable by the processor to cause the apparatus to update the plurality of profiles based on recent queries indicating the plurality of cloud resources.

20. The apparatus of claim 15, further comprising instructions executable by the processor to cause the apparatus to query the plurality of cloud resources for objects indicated in the join result.

* * * * *